(12) United States Patent
Randall

(10) Patent No.: US 6,863,004 B1
(45) Date of Patent: Mar. 8, 2005

(54) PROCESS AND SYSTEM FOR RECOVERING ENERGY FROM CARBON-CONTAINING MATERIALS

(75) Inventor: Denis A. Randall, Rutherford (AU)

(73) Assignee: World Oasis Australia Pty Ltd., New South Wales (AU)

( * ) Notice: Subject to any disclaimer, the term of this patent is extended or adjusted under 35 U.S.C. 154(b) by 132 days.

(21) Appl. No.: 10/089,403

(22) PCT Filed: Sep. 29, 2000

(86) PCT No.: PCT/AU00/01199

§ 371 (c)(1),
(2), (4) Date: Jun. 24, 2002

(87) PCT Pub. No.: WO01/23806

PCT Pub. Date: Apr. 5, 2001

(30) Foreign Application Priority Data

Sep. 29, 1999 (AU) ............................................. PQ3143

(51) Int. Cl.$^7$ .............................. F23C 9/00; F23B 5/02; F23G 7/00
(52) U.S. Cl. ........................ 110/341; 110/342; 110/229; 110/204; 110/233
(58) Field of Search ............................... 110/233, 341, 110/229, 230, 342, 231, 204; 48/197 R, 210

(56) References Cited

U.S. PATENT DOCUMENTS

| 4,117,786 A | | 10/1978 | Brose ......................... 110/229 |
| 4,233,024 A | * | 11/1980 | Plass ............................. 432/72 |
| 4,260,412 A | * | 4/1981 | Summers et al. ............... 75/35 |
| 4,432,290 A | * | 2/1984 | Ishii et al. ................... 110/346 |
| 4,840,129 A | * | 6/1989 | Jelinek ........................ 110/229 |
| 4,909,162 A | * | 3/1990 | Vollhardt ..................... 110/234 |
| 4,917,024 A | * | 4/1990 | Marten et al. ............... 110/233 |
| 5,323,714 A | * | 6/1994 | Cox ............................ 110/229 |
| 5,922,090 A | * | 7/1999 | Fujimura et al. ......... 48/197 R |
| 6,149,765 A | * | 11/2000 | Mansour et al. .............. 162/29 |

FOREIGN PATENT DOCUMENTS

| EP | 165839 A | 12/1985 |
| JP | 11141834 A | 5/1999 |

* cited by examiner

Primary Examiner—Kenneth B. Rinehart
(74) Attorney, Agent, or Firm—Medlen & Carroll LLP

(57) ABSTRACT

The invention provides processes and systems for generating heat from a carbon-containing material or converting a carbon-containing material to a combustible gaseous fuel, comprising (a) pyrolysing the material in a reactor to produce a carbon-enriched solid and a first gaseous product, (b) burning at least part of the first gaseous product and/or a second gaseous product obtained by reacting the carbon-enriched solid with water vapour to generate heat, and (c) returning combustion products from the burning step to the reactor and/or removing part of the first gaseous product and/or the second gaseous product as a combustible fuel.

14 Claims, 6 Drawing Sheets

PROCESS AND SYSTEM FOR RECOVERING ENERGY FROM CARBON-CONTAINING MATERIALS

TECHNICAL FIELD

The invention relates to processes and systems for converting carbon-containing materials, in particular waste materials containing organic substances, into combustible fuels and thereby recovering energy from the carbon-containing materials.

BACKGROUND OF THE INVENTION

The disposal of ever-increasing quantities of waste materials is a significant challenge in many parts of the world and is becoming a more significant problem as the world's population becomes increasingly urbanised. Furthermore, the increasing human population and increasing levels of affluence are resulting in larger quantities of waste materials of various kinds being generated. Disposal strategies currently utilised for dealing with wastes include landfill, biological degradation by various means, combustion, and various chemical treatment processes. However, each of these methods suffers from one or more disadvantages. For example, existing disposal methods may cause pollution, may be energy intensive, or may be wasteful of limited resources such as land. Additionally, many waste materials constitute a source of useful energy if efficient means of recovery of that energy can be devised. For example, waste incineration is an effective way of decreasing the bulk of waste material for disposal, but typically the heat generated by the incineration is not recovered, and in addition the process can lead to the generation of pollutants such as nitrogen oxides and dioxins, and the generation of large quantities of greenhouse gases. Hence there is a need for improved waste treatment or disposal processes which are environmentally benign and which result in the recovery of useful energy from the wastes.

It is an object of the present invention to provide an efficient method for the recovery of useful energy from carbon-containing materials, and simultaneously to provide an environmentally acceptable way of disposing of waste materials with minimal adverse environmental impact.

SUMMARY OF THE INVENTION

In a first embodiment of the invention there is provided a process for generating heat from a carbon-containing material which includes the steps of:

(a) pyrolysing said material in a pyrolysis zone of a reactor at an elevated temperature to produce a carbon-enriched solid and a combustible gaseous product;

(b) burning a first part of said combustible gaseous product to produce a first gaseous combustion product and to heat said pyrolysis zone so as to maintain said elevated temperature;

(c) removing a second part of said combustible gaseous product from said reactor;

(d) burning said second part of said combustible gaseous product to generate heat and produce second gaseous combustion products; and (e) returning said first and second gaseous combustion products to said pyrolysis zone.

Thus, the process of the first embodiment provides a process whereby useful energy may be recovered from a carbon-containing material, but which produces substantially no gaseous emissions, since substantially all of the gaseous products produced in tile process are returned to the process after they have been burned.

In one form of the process of the first embodiment of the invention, the carbon-enriched solid may be contacted with steam at a temperature at which the water gas reaction occurs, so as to produce therefrom a mixture containing hydrogen and carbon monoxide.

Thus, in a second embodiment of the invention there is provided a process for generating heat from a carbon-containing material Which includes the steps of:

(a) pyrolysing said material in a pyrolysis zone at a first elevated temperature to produce a carbon-enriched solid and a first combustible gaseous product;

(a') transferring said carbon-enriched solid and said first combustible gaseous product to a reaction zone;

(b) reacting said carbon-enriched solid with water vapour in said reaction zone at a second elevated temperature to produce a second combustible gaseous product containing hydrogen gas and carbon monoxide;

(c) burning a first part of said second combustible gaseous product to produce first gaseous combustion products and to heat at least said reaction zone so as to maintain said second elevated temperature;

(d) removing a second part of said second combustible gaseous product from said reaction zone;

(e) burning said second part of said second combustible gaseous product to generate heat and second gaseous combustion products; and (f) returning said first and second gaseous combustion products to said pyrolysis zone.

In a further form of the process of the invention, a part of combustible gaseous products produced by pyrolysis of the carbon-containing material, and/or produced by reaction of water vapour with the carbon-enriched solid, are removed from the reactor as a combustible gaseous fuel which may be transported if desired to a location remote from the reactor and from which energy may be recovered by any convenient method.

Therefore, a third embodiment the invention provides a process for converting a carbon-containing material to a combustible gaseous fuel which includes the steps of:

(a) pyrolysing said material in a pyrolysis zone at a first elevated temperature to produce a carbon-enriched solid and a first gaseous product;

(b) reacting said carbon-enriched solid with water vapour in a second reaction zone at a second elevated temperature to produce a second gaseous product containing hydrogen gas and carbon monoxide;

(c) burning a first part of (i) said first gaseous product, (ii) said second gaseous product or (iii) a mixture thereof so as to heat at least said reaction zone and maintain said second elevated temperature; and (d) removing the remainder of said first and second gaseous products as said combustible gaseous fuel.

In a fourth embodiment of the invention there is provided a system for recovering energy from carbon-containing material, the system including:

a reactor vessel having an exterior and an interior, said reactor being equipped with means to admit said carbon-containing material to said vessel and heating means to heat the vessel;

gas offtake means operatively associated with the reactor vessel to permit combustible gases generated in the vessel to be removed therefrom;

a first gas conduit between said gas offtake means and said heating means to transfer a first part of said gases generated in said vessel to said heating means;

ignition means adapted to ignite said gases in said heating means; and energy recovery means operatively associated with the gas offtake means for recovery of energy from a second part of said gases generated in said vessel.

In one form of the system of the fourth embodiment, the first gas conduit includes gas separation means which is capable of separating at least part of any hydrogen present in the gases generated in the vessel from other gases present, thereby producing a hydrogen-rich stream and a hydrogen depicted stream, and means to transfer the hydrogen-depleted stream to the heating means.

The system of the fourth embodiment may further comprise a second gas conduit between said heating means and said reactor vessel, to transfer gaseous combustion products from said heating means to the interior of said vessel. The energy recovery means typically includes a high pressure boiler wherein the second part of the gases generated in the reactor vessel is burnt. More typically, the system further includes a further gas conduit adapted to transfer gaseous combustion products from the energy recovery means to the interior of the reactor vessel.

DETAILED DESCRIPTION OF THE INVENTION

Figure 1:
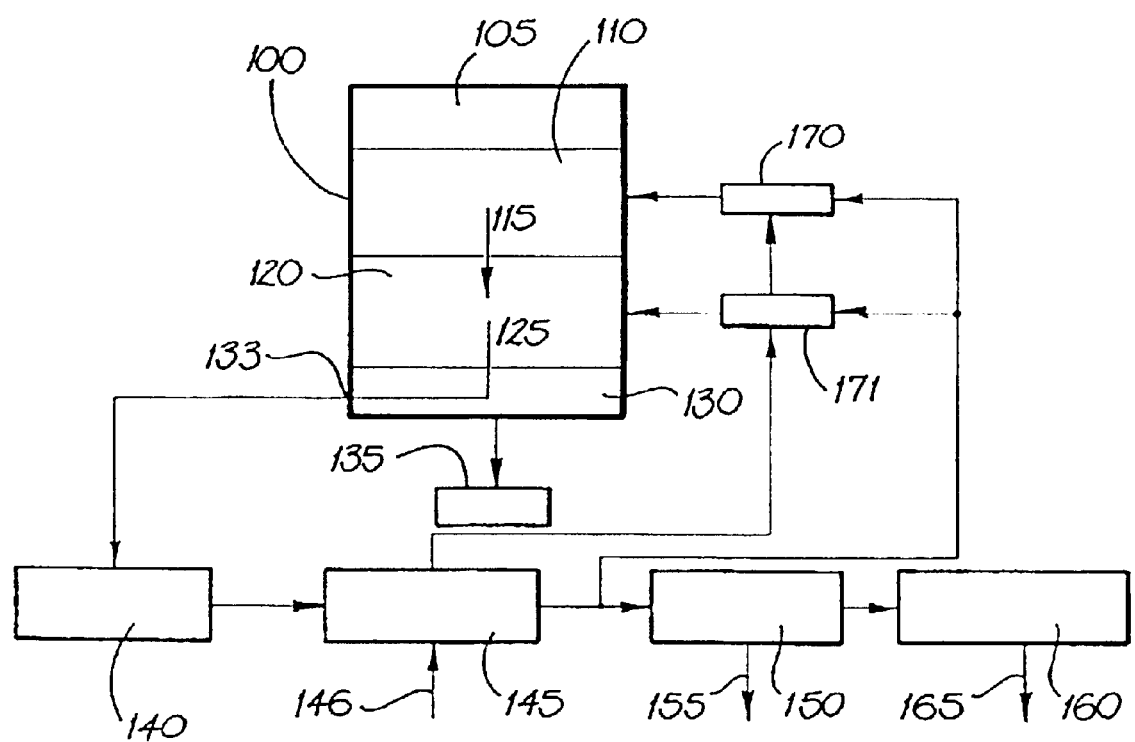
FIG. 1 is a schematic representation of a system for recovery of energy from carbon-containing materials utilising a process in accordance with the third embodiment of the present invention.

In the processes of the invention, the carbon-containing material usually contains carbon in chemically bound form, and may contain other elements. Usually, the material additionally contains the element hydrogen in chemically bound form. It may also contain oxygen and/or other elements. The material is typically a waste material, but it need not be. Thus, materials for use in the process of the invention may also include conventional solid fuels such as coal, coke, anthracite, bituminous coal, peat etc, or other materials such as timber, paper, cardboard, etc. However, advantageously the carbon-containing material is a waste material, which may be any organic waste such as sewage; municipal solid waste, agricultural products and waste of various kinds including wood waste, bagasse, rice hulls, prunings, abattoir waste and manure; industrial wastes of various kinds including pulping liquor from paper pulp mills, solids and sludges from waste water treatment, plastics, coal washing solids, shale, spent solvents, oil refinery wastes, contaminated soils, car tyres and so on. The composition of the waste is not critical to the process of the present invention, nor is its moisture content. However, typically the waste will have been processed in a preliminary step to remove gross quantities of water, where present, by one or more methods which are generally known in the art for that purpose such as centrifuging, filtering, skimming, evaporation, etc.

The pyrolysis reaction in the processes of the present invention typically occurs at a temperature in the range of about 200° C. to 600° C. more typically in the range 200° C. to 400° C. Generally, in the processes of the second and third embodiments the pyrolysis reaction occurs in the same reactor as reaction step (b) but it can occur in a separate reactor. A substantially oxygen-free atmosphere is typically generated in the pyrolysis zone by conducting the pyrolysis in a closed vessel so that any oxygen which the vessel contained initially is consumed by reaction with the carbon-containing material, or with elemental carbon, at the temperature of the pyrolysis zone. Alternatively the pyrolysis reaction zone may be initially purged with an oxygen-free gas, such as nitrogen, carbon dioxide, steam or mixtures thereof. For example, in the processes of the second and third embodiments a part of the gaseous product generated in reaction step (b) may be passed from the reaction zone for step (b) into the pyrolysis reaction zone so as to-sweep out oxygen.

The pyrolysis reaction results in coking or charring of the carbon-containing material to produce a carbon-enriched solid material and simultaneously generates low molecular weight organic substances which typically vaporise at the temperature of the pyrolysis reaction. Water vapour is also typically liberated as steam by the pyrolysis process, unless the carbon-containing material is dry and the carbon-containing substances present are mainly hydrocarbons (for example used car tyres). In the latter case, it will be necessary to add steam or water to the reaction zone in the processes of the second and third embodiments.

The pyrolysis reaction produces a carbon-enriched solid material and a vapour phase. Optionally, the vapour phase may be cooled to liquefy any condensable materials which it contains before the remaining gas, or part of it, is sent either to the reaction zone for step (b) (in the processes of the second and third embodiments) or for burning (in the process of the first embodiment). However usually the vapour phase is directed to its destination without cooling and condensation. Alternatively, in the processes of the second and third embodiments the vapour phase may be taken off from the pyrolysis zone and exploited for its energy content in any convenient way. In that case, it will be necessary to provide water or steam to the reaction zone.

In one form of the process of the third embodiment, at least part of the vapour phase from the pyrolysis zone is removed from the reactor and a portion of it is burned to generate at least part of the heat necessary to maintain the first and/or second elevated temperatures. In this form, part or all of the combustion products generated by burning the vapour phase removed from the pyrolysis zone is provided to the reaction zone to provide at least part of the water vapour required for step (b).

In another form of the process of the third embodiment step (c) consists of burning a first part of a mixture of the first gaseous product and the second gaseous product. Typically, in this form of the process the combustion products of step (c) are returned to the reactor such that they must pass through the carbon-enriched solid in the reaction zone before leaving the reactor. Usually in this form of the process of the third embodiment, the first part of the mixture of first gaseous product and second gaseous product is typically obtained from a gas separation step whereby it is relatively enriched in carbon monoxide and/or carbon dioxide, compared to the mixture of first and second gaseous products as a whole. Typically, the gas separation step produces a fraction of the mixture of the first gaseous product and the second gaseous product, which fraction contains substantially all of the carbon monoxide and carbon dioxide present in the mixture of first and second gaseous products. This fraction which contains substantially all of the carbon monoxide and carbon dioxide is then combusted, and the combustion products are returned to the interior of the reactor in such a way that they must pass through the reaction zone and contact the carbon-enriched solid in the reaction zone before leaving the reactor once again.

Typically, in the processes of the invention, the amount of oxygen provided for burning the part or parts of the of the gases which are removed from the reactor and combusted, is a stoichiometric or sub-stoichiometric amount, so that the combustion products which are returned to the reaction zone typically contain substantially no oxygen gas.

Condensable products obtainable by cooling the vapour phase removed from the pyrolysis zone depend on the nature and composition of the carbon-containing material. For example, the carbon-containing material may contain essential oils or relatively volatile natural oils which may be recovered by cooling the vapour phase removed from the pyrolysis zone to a suitable temperature. Leaves or other parts of plants containing natural oils may thus be used as the carbon-containing material, for instance, from which may be recovered at least part of the natural oils they contain, such as coconut oil, palm oil, cottonseed oil, corn oil, soybean oil, rapeseed oil, sunflowerseed oil, linseed oil, eucalyptus oil, tea tree oil and the like.

In step (b) of the processes of the second and third embodiments the carbon-enriched solid from the pyrolysis step is contacted with steam in a reaction zone at a second elevated temperature, thereby undergoing a water gas reaction to produce a gaseous mixture containing hydrogen and carbon monoxide. Some carbon dioxide may be produced in this reaction also. Typically, a mixture of carbon monoxide and carbon dioxide is generated, but it will be appreciated that the relative proportions of carbon monoxide and carbon dioxide depend on the ratio of steam to carbon in the reaction zone, on the temperature of operation and on the concentration of oxides of carbon already present. Chemical reactions occurring in the reaction zone may be represented schematically as follows:

$$C + H_2O \longrightarrow CO + H_2 \quad (1)$$

$$CO + H_2O \longrightarrow CO_2 + H_2 \quad (2)$$

$$CO_2 + C \rightleftharpoons 2\,CO \quad (3)$$

Additionally, if any oxygen is present in the reaction zone, the following reactions can occur:

$$C + O_2 \longrightarrow CO_2 \quad (4)$$

$$2\,C + O_2 \longrightarrow 2\,CO \quad (5)$$

Hence, if sufficient steam is available and carbon monoxide is removed from the reaction zone, carbon in the carbon-enriched solid tends to be consumed and converted into oxides of carbon. Further charring/coking of the carbon-enriched solid may also occur in the reaction zone. Advantageously, however, carbon monoxide is permitted to accumulate in the reactor by recycling to the reactor all combustion products after burning the first and second gaseous products, as in the process of the second embodiment.

In another form of the processes of the invention, gases produced in the reactor may be removed from the reactor and at least part of the carbon dioxide and carbon monoxide may be at least partially separated from hydrogen by conventional means. In this form, the separated carbon monoxide and carbon dioxide (which may also contain some nitrogen) are typically combusted and the combustion products are returned to the interior of the reactor, typically the reaction zone.

Typically, the water vapour or steam for the reactions in the reaction zone is provided by the vapour phase from the pyrolysis reaction. However, depending on the water content of the carbon-containing material originally, or for other operational reasons, it may be necessary or desirable to utilise an external source of water or steam for use in step (b).

Where the vapour phase from the pyrolysis zone supplies some or all of the water vapour for reactions in the reaction zone, the vapour phase from the pyrolysis reaction may be caused to flow through the pyrolysis zone and reactor zone in the same direction as the carbon-containing material passes through them, or it may flow countercurrent to them. Alternatively, as noted above, at least part of the vapour phase from the pyrolysis zone in the process of the third embodiment, or a part of a mixture of the vapour phase from the pyrolysis zone and the gaseous products produced in the reaction zone, may be removed from the reactor and burned, and the combustion products may then be supplied to the reaction zone either co-current or countercurrent to the direction of movement of the carbon-containing material. More typically, the combustion products are supplied to the reaction zone so that they pass through the reaction zone in a direction opposite to the direction in which the carbon-containing material moves.

The second elevated temperature is typically a temperature in the range of about 200° and upwards. The temperature is, however, usually to the lower end of this range, typically about 315° C. to about 480° C., for reasons of energy conservation and to lower the strength of the ash produced from the carbon-containing material by the processes of the invention. High ash strengths can lead to difficulties with ash removal from the reactor.

Since at least reaction (1) and forward reaction (3) above are endothermic, an external source of heating must be provided to the reaction zone in order to maintain the reaction. Except when the process of the invention is first started up, the heat necessary to sustain step (b) in the processes of the second and third embodiments is provided by burning a part of the water gas generated in step (b) and/or a part of the gaseous product generated in the pyrolysis step. More typically, substantially all of the gaseous product generated in the pyrolysis step is passed to the reaction zone for step (b), and hence the Gaseous product containing hydrogen and oxides of carbon generated by step (b) is mixed with gaseous products obtained during the pyrolysis step. It will be appreciated, however, that low molecular weight organic substances generated during the pyrolysis step may undergo further reactions under the conditions of the water gas reaction in step (b).

In the process of the first embodiment typically about 30% by volume of the gaseous materials generated in the pyrolysis zone is burnt to provide the heat necessary to maintain the elevated temperature in the pyrolysis zone. Similarly, in the in the processes of the second and third embodiments typically about 30% by volume of the gaseous materials generated in steps (a) and (b) is burnt to provide the heat necessary to sustain the reactions in step (b). However, it will be appreciated that in all cases the quantity of gaseous product required to be combusted for these purposes will depend on the carbon content of the carbon-containing material used, its water content and other components present.

From the foregoing it will be seen that typically approximately 70% by volume of the gaseous product generated in the processes of the invention is available for removal from the reactor and constitutes a useful fuel. For example, the gaseous products removed from the reactor may be burnt in a high pressure boiler so as to raise steam for the generation of electricity, or for any other conventional purpose.

The portion of the gaseous product which is burnt to maintain the temperature(s) in the reactor may be combusted in air, and the resulting heat applied externally to the reactor. More usually, however, the combustion gases are returned to the interior of the reactor, though they may also be passed through a heating jacket external to the reactor before being directed to the interior of the reactor. In the processes of the second and third embodiments this may provide a further source of water vapour for reaction step (b). Where the combustion gases are returned to the reactor, in order to avoid build up of nitrogen in the process, it is more typical to utilise pure oxygen, rather than air, for the combustion step. Advantageously, where the gaseous product removed from the process of the invention is combusted for the purpose of generating electricity, some of that electricity may be used for the electrolysis of water to generate oxygen for use in the combustion of the gaseous product(s) of the process. In one form of the process of the third embodiment, a further portion of the first and/or second gaseous product is combusted to provide the heat necessary to sustain the first elevated temperature for the pyrolysis step, step (a).

In one form of the processes of the invention, flue gases may be supplied to the pyrolysis zone or the reaction zone, or both, for remediation. The flue gas may derive, for example, from combustion of a fossil fuel such as coal, coke, fuel oil or natural gas in a boiler. Especially when the fossil fuel is coal, coke or fuel oil, the flue gas typically contains carbon-containing particulates, which can be removed by passage of the flue gas through a process in accordance with the present invention.

In the process of the first embodiment, the combustible gaseous product is burnt to generate heat and combustion products. Similarly, in the process of the second embodiment the part of the second combustible gaseous product which is not burnt to provide the heat necessary to maintain the temperature of the pyrolysis zone and/or the reaction zone is burnt to generate heat and combustion products. The heat generated from these steps may be recovered and utilised in any desired manner, but typically it is utilised to raise steam for electricity generation. The combustion products are returned to the pyrolysis zone in these embodiments of the invention. The combustible gaseous products may be burnt in air, whereupon a bleed of vapour from the system will be necessary to avoid buildup of nitrogen. However, more typically the gaseous fuel is burnt using pure oxygen. In that case, no buildup of gases occurs in the system, and no gaseous effluent is produced.

When flue gas is supplied to the process of the second embodiment, similarly, a bleed of gases will be required to prevent buildup of nitrogen. Typically this will occur by removal of a part of the combustion product produced in step (e), which, apart from water vapour and possibly nitrogen, contains carbon dioxide which may be recovered for commercial use by standard methods.

Buildup of carbon monoxide and carbon dioxide in the system during continuous operation of the process of the first or second embodiments, and in continuous operation of the process of the third embodiment when carbon oxides arc returned to the interior of the reactor, if there is no bleed of gases from the system, tends to be inhibited by reaction (3) represented above, which is driven to the left by a tendency of carbon monoxide to accumulate, and to the right by a tendency of carbon dioxide to accumulate. Thus, under steady continuous operation conditions the carbon monoxide and carbon dioxide concentrations reach steady levels (given a constant rate of feeding carbon in the carbon-containing material) and substantially all of the carbon which enters the reactor leaves it as elemental carbon (soot) which is removed from the reactor with ash from the carbon-containing material. It will be appreciated that under these conditions the carbon-containing material must contain at least hydrogen (in chemically bound form) in addition to carbon, and the energy recovered from the process derives substantially from the hydrogen which is present in the material.

It will be appreciated that once the process of the invention has been initiated, it may be operated so as to be essentially self-sustaining by feeding to the reactor continuously or batch-wise additional carbon-containing material and periodically removing from the reactor ash or other inert materials. Carbon may also be removed from the reactor with the ash in some embodiments of the invention. If necessary, the carbon content of the carbon-containing material may be adjusted by blending different materials of different carbon contents so as to maintain a substantially constant supply of carbon to the reactor. Typically, the carbon content of the carbon-containing material is at least about 6% by weight, based on the total weight of the carbon containing material, and the moisture content is typically not more than about 94% by weight on the same basis, in order for the process of the invention to be self-sustaining.

When the combustible gaseous product produced by the process of the invention is burnt to raise steam (and especially when it is burnt in oxygen rather than air), the combustion gases may be recycled to the reactor in the pyrolysis zone and/or the reaction zone. This results in an essentially closed gas circulation system from which essentially no gaseous effluent is produced.

At start up, an external source of heat is required in order to elevate the pyrolysis zone to the elevated temperature of the pyrolysis reaction, and to elevate the reaction zone, when present, to the second elevated temperature. Such an external source of heat may be any convenient source, but is typically a combustible gas or oil.

A reactor vessel for use with a process of the present invention may conveniently be a twin-bell reactor of the type typically used in blast furnaces. This type of reactor includes two chambers, one above the other, the upper of which is a hopper for holding a quantity of carbon-containing material, and the other chamber is a reactor chamber. The hopper is separated from the reactor by a relatively narrow neck which is capable of being closed by a bell-shaped valve. Similarly, the hopper is closeable at its upper end by a similar bell-shaped valve. In operation, the hopper compartment is charged with the lower bell valve in the closed position and the upper one in the open position, whereafter the upper bell is closed and the lower one opened so as to cause the hopper contents to discharge into the reactor. The lower bell is then closed while the reactions proceed. In this way, charging of the reactor may be completed without substantial interruption to the reactions taking place and without the admission of unlimited quantities of air. The hopper vessel may be purged of air before it is discharged into the reactor, if so desired. Typically, purging of air is achieved using steam or carbon dioxide, more usually steam. The reactor vessel may conveniently be provided with a suitable bottom valve for removal of ash periodically.

It will be appreciated, however, that other reactor designs may be employed in the processes of the present invention. Alternative reactor designs for carrying out processes in accordance with the invention will be readily apparent to persons of ordinary skill in the art, given the teaching herein.

Conveniently, any unconverted organic materials present in the ash discharged from the reactor may be separated by discharging the ash into water, whereby organic-containing materials tend to float and may be skimmed off and returned to the reactor. Typically, at least a part of the ash removed from the reactor is returned to the pyrolysis zone for mixing with the carbon-containing material, to increase the porosity of the solid materials in die pyrolysis zone and/or the reaction zone.

Best Method and Other Methods for Carrying Out the Invention

FIG. 1 is a schematic representation of a system for recovery of energy from carbon-containing materials utilising a process in accordance with the third embodiment of the present invention. Referring to FIG. 1, the system includes reactor 100 which is charged with carbon-containing materials 105 in an upper part of the reactor. Below carbon-containing materials 105 is pyrolysis zone 110 in which carbon-containing materials 105 are converted to carbon-enriched materials. Beneath pyrolysis zone 110 is reaction zone 120 in which the carbon-enriched materials react with water vapour to produce hydrogen and oxides of carbon. Zone 130 is an ash zone, from which ash may be removed into ash receiver 135. Gas offtake 133 is provided to reactor 100, for transferring gases from reactor 100 to boiler 140 for recovery of heat contained in the gases, and thence to gas cooler 150 via air/oxygen preheater 145. Gas cooler 150 is connected to gas storage vessel(s) 160, which is equipped with water off-take 165. The gas outlet of preheater 145 is also connected to burners 170, 171.

In use, reactor 100 is charged with carbon-containing materials 105 near its top which pass through pyrolysis zone 110 and reaction zone 120 into ash zone 130 prior to removal from the reactor 100 into ash receptacle 135. That is, as ash is removed from reactor 100, successive charges of carbon-containing material 105 move down reactor 100 through zones 110, 120 and 130. Gaseous products 115 of pyrolysis move downwards through reactor 100 into reaction zone 120 where carbon present in carbon-enriched material produced in pyrolysis zone 110 reacts with water vapour generated in that zone or introduced into it, to produce a gaseous product 125 enriched in hydrogen and oxides of carbon which passes out of reactor 100 through gas collection port 133. Waste heat present in gaseous product 125 is recovered in boiler 140 from which the gaseous stream passes into preheater 145, gas cooler ISO and then into gas storage vessel 160. In preheater 145, oxygen or air are preheated before being fed to burners 170, 171. A portion of gas exiting preheater 145 is passed to burners 170, 171 where the gas is combusted and the generated heat and combustion products are directed to pyrolysis zone 110 and reaction zone 120 of reactor 100 so as to sustain the desired temperatures in those zones. In gas cooler 150, water and other condensables 155 are removed from the gaseous stream exiting preheater 145. Organic condensables may be separated from water in stream 155 and returned to reactor 100. Gas from gas storage vessel 160 typically predominantly contains carbon monoxide, hydrogen and gaseous organics, and may be removed from storage vessel(s) 160 for combustion and energy, recovery.

Figure 2:
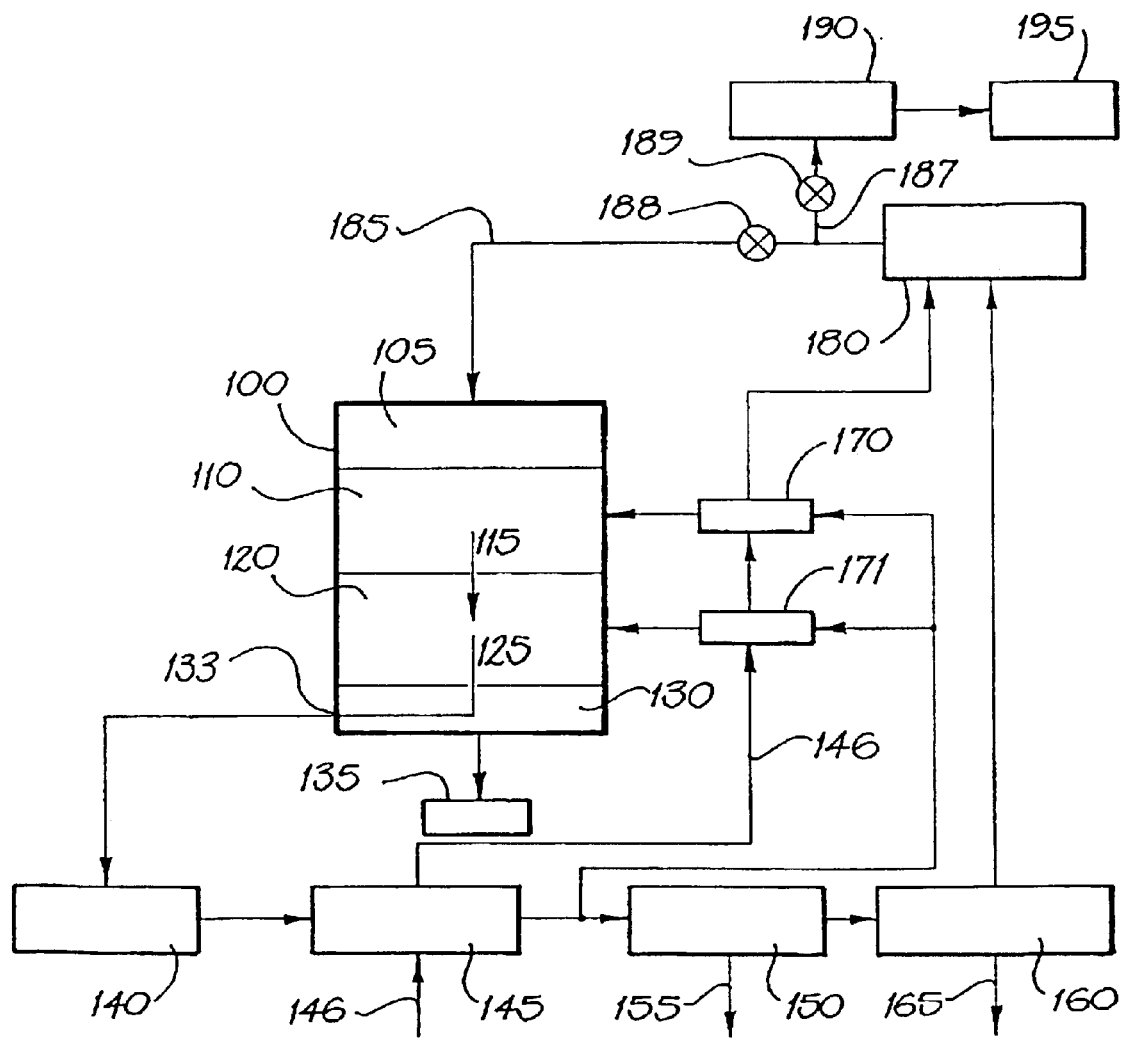
FIG. 2 is a schematic representation of a system for recovery of energy from carbon-containing materials utilising a process in accordance with the second embodiment of the present invention.

FIG. 2 is a schematic representation of a system for recovery of energy from carbon-containing materials utilising a process in accordance with the second embodiment of the present invention. The system illustrated in FIG. 2 includes all of the components of the system illustrated in FIG. 1 and additionally includes which pressure boiler 180 connected to gas storage vessel(s) 160 and provided with preheated air or oxygen 146 from preheater 145. Exhaust line 185 from high pressure boiler is connected to reactor 100 and is equipped with valve 188, and is also connected via line 187 to gas cooler 190. Line 187 is equipped with valve 189. Gas cooler 190 is connected to carbon dioxide storage 195.

In use, the system illustrated in FIG. 2 is operated in the same way as the system illustrated in FIG. 1, as described above, except that gas stored in gas storage vessel(s) is not removed for combustion but is sent to high pressure boiler 180 for combustion. Exhaust from boiler 180 typically contains predominantly carbon dioxide and water vapour and is normally returned via line 185 to reactor 100. That is, normally valve 188 is open and valve 189 is closed. If it is desired to remove carbon dioxide from the system, valve 188 may be closed and valve 189 opened, to direct exhaust from boiler 180 to as cooler 190 and thence to carbon dioxide storage 195.

Figure 3:
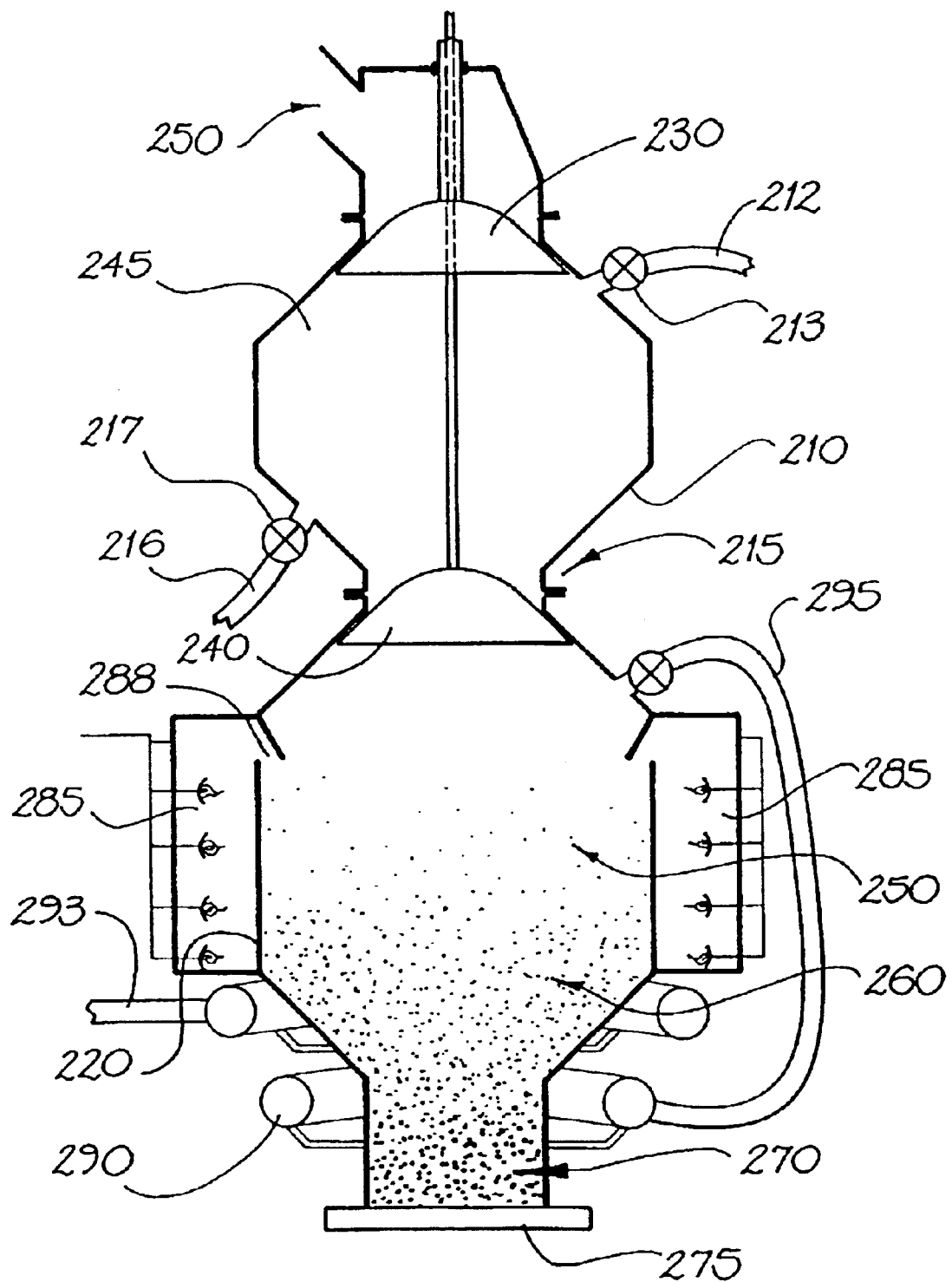
FIG. 3 is a diagram of a suitable reactor for carrying out a process in accordance with the invention.

FIG. 3 is a diagram of a suitable reactor for carrying out a process in accordance with the invention. As seen in FIG. 3, reactor 200 includes hopper 210 and reaction chamber 220 below hopper 210. Hopper 210 and reaction chamber 220 are separated by neck region 215 which is closeable by first bell valve 240. Second bell valve 230 permits the upper end of hopper 210 to be closed to the atmosphere. Above second bell valve 230 is charging port 250 for charging solid materials into hopper 210. Hopper 210 is equipped with steam inlet 212 and steam outlet 216, which are fitted with isolation valves 213, 217 respectively.

Reaction chamber 220 is surrounded in its upper portion by firebox 285 equipped with vents 288 for admission of combustion gases from firebox 285 into reaction chamber 220. Reaction chamber 220 is also equipped with ash removal valve 275, gas offtake manifold 293 and gas supply manifold 290 which is connected via gas return 295 to an upper portion of reaction chamber 220.

During continuous operation of reactor 200, first bell valve 240 is normally in the closed position and second hell valve 230 is moved to the open position for charging carbon-containing material 245 into hopper 210 through charging port 250. When this charging step has been completed, second bell valve 230 is moved to the closed position and steam is passed through hopper 210 from steam inlet 212 to steam outlet 216 by opening valves 213, 216, for a time sufficient to purge substantially all of the air from hopper 210. Valves 213, 216 are then closed and first bell valve 240 is opened to permit carbon-containing material 245 to fall into reaction chamber 220. Materials in reaction chamber 220 occupy a pyrolysis zone 250 above reaction zone 260 and ash zone 270. In pyrolysis zone 250 coking or charring of carbon-containing material 245 occurs at the elevated temperature maintained in pyrolysis zone 250 owing to heating of reaction chamber 220 from firebox 285. As additional carbon-containing material 245 is charged into reaction chamber 220 and ash is removed from ash zone 270, material is pyrolysis zone 250 progresses through reactor into reaction zone 260. In reaction zone 260, carbon-enriched material from carbon-containing material 245 reacts with steam generated in pyrolysis zone 250 or present in gases introduced into reaction chamber 220 (for example from firebox 285 via vents 288 or through gas return 295) and produces hydrogen and mixed oxides of carbon. These gases are removed into gas off take manifold 293. Some gases in gas off-take manifold 293 are returned to firebox 285 (connection not shown) or returned to gas supply manifold 290 and thence via gas return 295 to reaction chamber 220. However, the majority of gases are taken off for combustion and recovery of useful energy therefrom. With further charges of carbon-containing material into reaction chamber 220 and progressive removal of ash 270 via ash removal valve 275, material in reaction zone 260 eventually reaches ash zone 270 and is ultimately removed from reactor 200.

Figure 6:
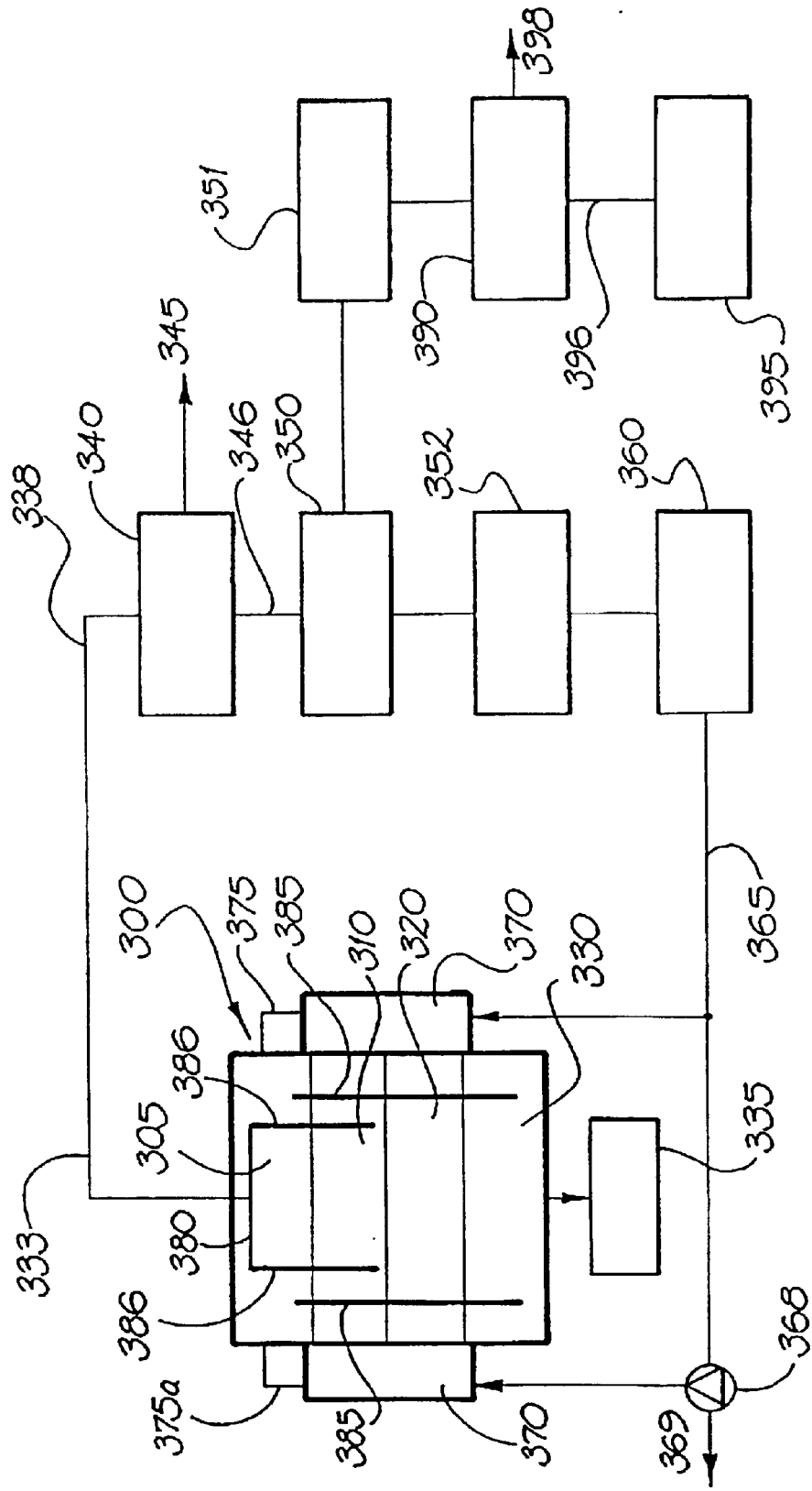
FIG. 6 is a schematic representation of an alternative system for recovery of energy from carbon-containing materials utilising a process in accordance with the third embodiment of the present invention.

FIG. 6 is a schematic representation of an alternative system for recovery of energy from carbon-containing materials utilising a process in accordance with the third embodiment of the present invention. Referring to FIG. 6, the system includes reactor 300 which is charged with carbon-containing materials 305 in an tipper part of reactor 300. Below carbon-containing materials 305 is pyrolysis zone 310 in which carbon-containing materials 305 are converted to carbon-enriched materials. Beneath pyrolysis zone 310 is reaction zone 320 in which the carbon-enriched materials react with water vapour to produce hydrogen and oxides of carbon. Zone 330 is an ash zone, from which ash may be removed into ash receiver 335.

Gas offtake 333 is provided to reactor 300, for removing gases from reactor 300. Pipe 338 connects gas offtake 333 to gas scrubber system 340 in which reactor gases may be separated from condensables. Gas scrubber system 340 is equipped with condensables offtake 345 and pipe 346 which connects gas scrubber system 340 to gas separation system 350 and conveys gases from gas scrubber system 340 to gas separation system 350.

Optionally, the heat content of gas removed from reactor 300 by gas offtake 333 may be utilised before the gases reach gas scrubber system 340. For example, gases in pipe 338 may be passed though a heat exchanger (not shown) for recovery of useful heat energy, or the gases may be used to heat the pyrolysis zone and/or reactor zone of another reactor similar to reactor 300 (also not shown) being operated at the same time as reactor 300 for recovery of energy from other carbon-containing materials.

Gas separation system 350 is typically a gas decant system but may include any suitable means for separating hydrogen, at least partially, from other gases present, predominantly oxides of carbon, and nitrogen. Thus, gas separation system 350 is connected to two gas storage units 351, 352 to permit gases separated in separation unit 350 to be passed to, and stored in, storage units 351 and 352 for hydrogen-rich and hydrogen-depleted gases respectively.

Gas storage unit 352 is connected to furnace 360. A supply of air and/or oxygen is also connected to furnace 360 (not shown). Exhaust from furnace 360 is connected via line 365 to heater jacket 370 which is provided to reactor 300. Line 365 is also equipped with valve 368, an outlet of which is connected to exhaust 369, which is open to the atmosphere.

Gases leave heater jacket 370 and are led to the interior of reactor 300 via pipes 375, 375a. Pipes 375, 375a may be equipped with an exhaust vent to atmosphere (exhaust vent not shown) which is normally closed by means of a valve but which may be opened if necessary to release pressure or divert combustion gases exiting furnace 360 away from reactor 300 if desired.

Reactor 300 is equipped internally with a plurality (typically 4) of downcorners 385 (two shown in FIG. 6) which extend from above pyrolysis zone 310 to below reaction zone 320, and with a plurality (typically 8) of risers 386 (two shown in FIG. 6) which extend only part of the depth of reactor 300 and typically end in or above reaction zone 320. Risers 386 are connected at their upper end via manifold 380 to gas offtake 333. Alternatively; pipes similar to 375, 375a may lead from heater jacket 370 into ash zone 330 of reactor directly, instead of into zone 305 as shown. In that case (which is not shown in FIG. 6) downcorners 385 are omitted.

Gas storage unit 351 is connected to boiler 390 which is equipped with exhaust vent 398, and steam line 396 which leads to electricity generation system 395.

In use, reactor 300 is charged with carbon-containing materials 305 near its top, which pass through pyrolysis zone 310 and reaction zone 320 into ash zone 330 prior to removal from the reactor 300 into ash receptacle 335. That is, as ash is removed from reactor 300, successive charges of carbon-containing material 305 move down reactor 300 through zones 310, 320 and 330.

Carbon-containing materials 305 are pyrolysed predominantly in pyrolysis zone 310 with the generation of carbon-enriched solids and gaseous pyrolysis products. Also introduced into reactor 300 are combustion gases produced in furnace 360 and passed into reactor 300 via heater jacket 370 and pipes 375, 375a. These combustion gases mix in zone 305 with gaseous pyrolysis products produced in pyrolysis zone 310 and the mixture passes through downcorners 386 and up through reaction zone 320 before entering risers 386 and leaving reactor 300 via manifold 380 and gas offtake 333. In reaction zone 320, water vapour generated predominantly in pyrolysis zone 310, and carbon dioxide, react with carbon-enriched material in reaction zone 320 to produce gaseous products enriched in hydrogen and carbon monoxide.

From gas offtake 333, the mixed gases pass via pipe 338 to gas scrubber system 340. Gas scrubber system 340 may comprise any suitable means for separating gases from condensable substances, such as oils volatilised from carbon-containing materials 305 in pyrolysis zone 310. For example, gas scrubber system 340 may comprise a water scrubber for separating gases from less volatile substances, equipped with a decanter for separating oils from water. Reactor gases separated in gas scrubber system 340 are transferred via pipe 346 to gas separation system 350, in which hydrogen is at least partially separated from other gaseous products.

Thus, two gaseous streams exit gas separation system 350. A first stream which is relatively hydrogen-rich, passes to storage unit 351 and the seemed stream passes to storage unit 352 prior to being passed to furnace 360 where it is burned in air or oxygen. The combustion product gases are conducted through line 365 to heater jacket 370 of reactor 300, for heating pyrolysis zone 310 and/or reaction zone 320 of reactor 300, and hence via pipes 375, 375a to the interior of reactor 300 as described above.

If desired, valve 368 may be partially opened or completely opened temporarily to divert combustion gases 365 partially or completely to exhaust.

The gases in gas storage unit 351 are utilised as combustible fuel for recovery of energy, by generating electricity. Thus, gas from gas storage unit 351 is burned in boiler 390 to raise steam which is passed via steam line 396 to electricity generation system 395. Electricity generation system 395 typically includes a turbine and generator of conventional design.

At startup of the system, if no or insufficient gas is stored in gas storage unit 352, an alternative combustion fuel is supplied to furnace 360. This alternative fuel may be fuel oil, natural gas or similar, or may conveniently include oils removed from gas scrubber system 340 via condensable offtake 345 during a previous operation of the system.

Since the processes of the first and second embodiments of the invention may be operated as essentially a closed system, or at least one in which the quantity of gaseous effluent is substantially decreased compared to processes which rely on total combustion of organic materials in waste, they are processes with little or no adverse impact on the environment. Although a process in accordance with the third embodiment of the invention may release carbon dioxide to the atmosphere, it provides a process whereby useful energy can be recovered from waste materials with a net reduction in the volume and other problems associated with disposal of the waste. However, as noted above, the process of the third embodiment may be operated essentially as a closed system with regard to oxides of carbon, so that any carbon introduced into the reactor in the waste material or other carbon-containing material, leaves the system not as carbon dioxide, but as elemental carbon. Other major byproducts of the process are water and ash, which may be utilised as a soil substitute or soil conditioner. The other major by-product of the process, namely water, is in increasingly short supply in many parts of the world, and the process of the invention provides a new source of water which may be used, for instance, for irrigation or in domestic water supply (after appropriate treatment).

EXAMPLE

Figures 4A, 4B, 4C:
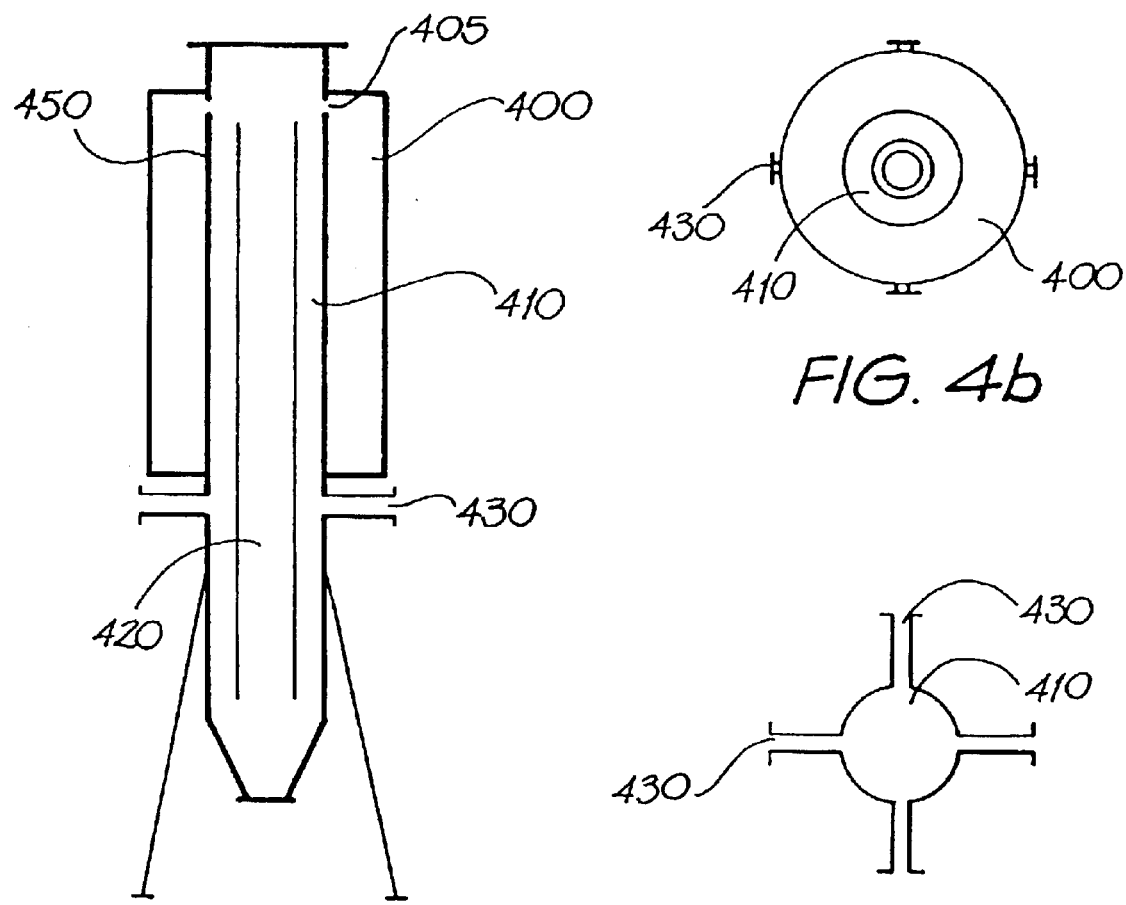
FIG. 4 is a diagrammatic representation of a reactor used in laboratory scale trials of a process according to the invention.

The following is a description of laboratory scale trials of a process in accordance with the invention.
Apparatus The reactor was constructed as in FIG. 4 with schedule 40 pipe and 8 mm plate. In FIG. 4. FIG. 4A is a vertical cross-sectional view of die reactor, FIG. 4B is a plan view of the reactor, and FIG. 4C is a diagrammatic representation of the relative position of gas offtake points from the reactor. Legs, bracing and footings were constructed from 3×3×0.25-inch (75×75×6.4 mm) angle section. All flanges and blanks were ANSI 300 lb (2070 kPa) fittings. The lid to the reactor, a 24" (600 mm) flange & blank (ANSI-300 lb (2070 kPa)) was fitted with pressure relief valve set at 100 psi (689 kPa) and pressure gauge. It was also fitted with a 2.5" (64 mm) flanged stub and ball valve to allow access of a steel, graduated dipstick.

Figure 5:
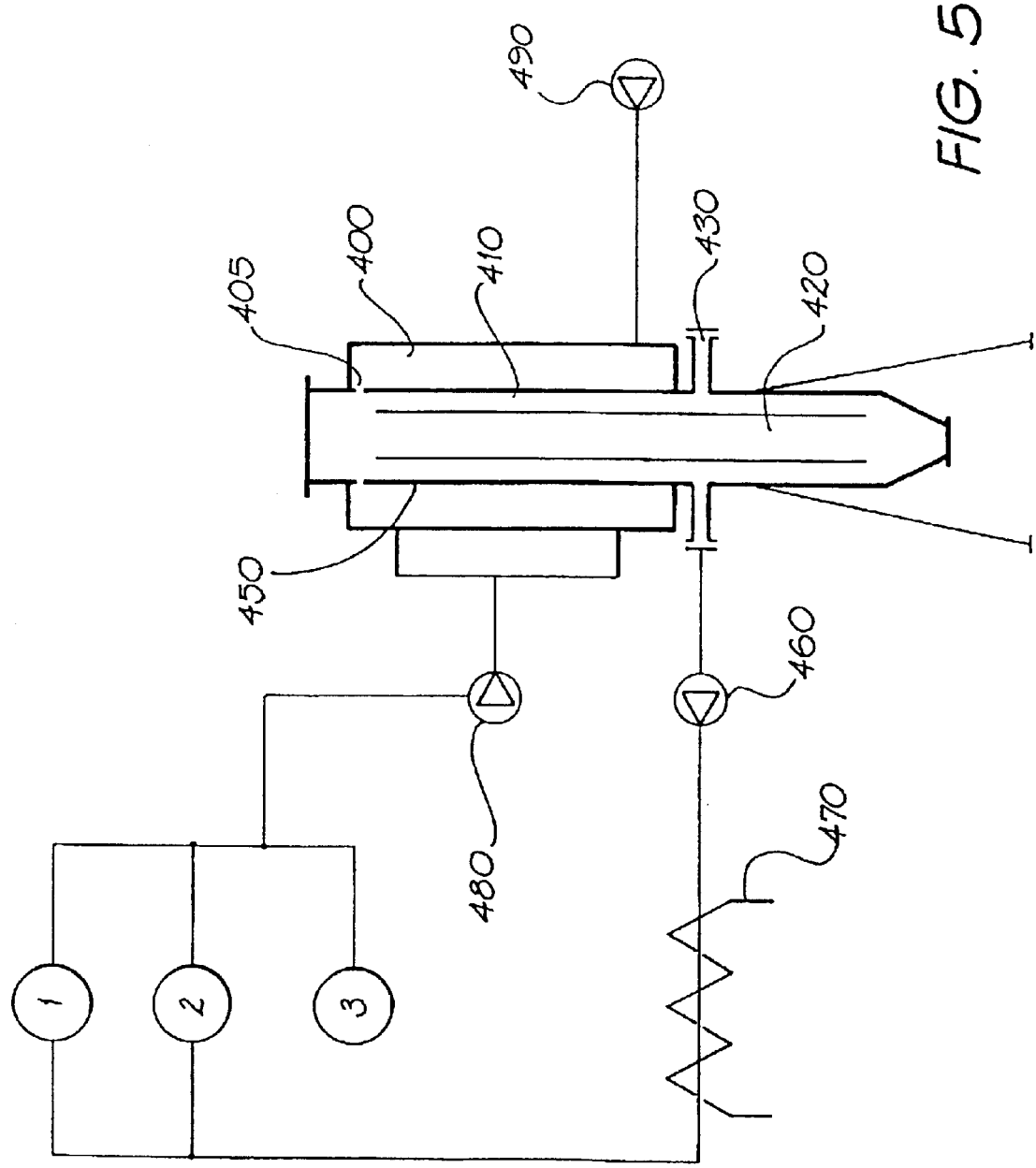
FIG. 5 is a schematic representation of a system used in laboratory scale trials of a process according to the invention.

As seen in FIGS. 4 and 5, the reactor consists of a firebox 400 surrounding the upper part of the reactor body 450 which consists of an annular space 410 defined in part by the firebox 400 and by central downcorner 420. Firebox 400 opens into the reactor body 450 through openings 405, just above the top of downcorner 420. The overall height of the reactor, not including its legs, is 3.9 m. Downcorner 420 has a diameter of 0.6 m and annular space 410 has a thickness of 0.3 m. Firebox 400 has a height of 2.0 m and an outside diameter of 1.2 m, the upper end of firebox 400 being 3.15 m above the lower end of downcorner 420. Downcorner has length 3.0 m and opens at its lower end just above a 0.4 m deep tapered end of reactor body 450. At a height of 1.5 m above its lower end, reactor body 450 is equipped with gas outlets 430.

Four gas ring burners were installed at 90-degree rotation intervals at the 0.25 m elevation from the bottom of the firebox and with the tip of the flame impinging on the heating surface of reactor body 450. Four more gas ring burners were placed at 45 degree rotation from the first set and again 90 degrees rotation between the burners at the 1.25 m elevation. Each burner ring was individually equipped with an isolation valve. 0.5" (12 mm) sockets at 4 locations served as inlets for compressed air.

The complete outside surface of the apparatus was insulated with asbestos cement fibre and coated with phenolic resin. The internal surface of the external walls of the firebox was coated with vermiculite refractory paste.

This design results in a 12" (300 mm) thick annular space to be charged with waste and heated by the flame on one side and hot exhaust and volatile gases on the other.

The combustion gases pass from the firebox 400 into the reaction chamber through 6" (150 mm) holes 405 and mix with volatile gases generated by heating carbon-containing material in annular space 410, and the gases pass down the downcorner 420. These gases then exit the downcorner 420 and migrate back up through carbonaceous residue in the lower part of annular space 410, to exit to a compressor 460 by way of 4×6" (150 mm) outlets as illustrated diagramatically in FIG. 4C, and a manifold fitted with a rupture disc.

From the compressor 460, the gas/vapour passes through a water-cooled heat exchanger 470 and into one of two parallel piped storage vessels 1, 2, as illustrated schematically in FIG. 5. The storage vessel design includes a steam trap, fitted with a "goose neck" water draw. Further it is fitted with 100-psi (689 kPa) pressure gauge, pressure relief valve, gas purge and product effluent valves. The effluent valves are joined together by way of a manifold and then connected to a second compressor 480 by way of a pipe section containing a rupture disc. The second compressor 480 is then connected to the burner feed manifold. Air compressor 490 supplies air for combustion to firebox 400.

A bottled LPG manifold 3 set up as the initial heat source is also connected to the burner feed manifold.
Charge Volume Calculation

| Volume of waste zone | | |
| --- | --- | --- |
| Outer diameter | 0.6 | m |
| Inner diameter | 0.3 | m |
| Length | 2 | m |

-continued

| | | |
|---|---|---|
| Volume annular space | 0.424 | m³ |
| Volume of carbon zone | | |
| Outer diameter | 0.6 | m |
| Inner diameter | 0.3 | m |
| Length | 1 | m |
| Volume annular space | 0.212 | m³ |
| Volume of ash zone | | |
| Cone volume | 0.038 | m³ |
| Height | 0.4 | m |
| Diameter | 0.6 | m |
| INITIAL CHARGE VOLUME | 0.674 | m³ |
| DESIGN CHARGE/HR | 0.4 | m³ |

Destruction—Principles Involved.

On filling the reactor the waste feeds into the annular space between the firebox and the central down comer. On entrance to this space the waste is in the coking (pyrolysis) stage.

Stage I—The Coking Stage

The coking stage of the process takes place in the top 2 m of the reactor where complex organic compounds are broken down by heating them to temperatures above 400° F. (205° C.) to produce carbon or char, low molecular weight organics (which volatilise), water (which is converted to steam) and silica and inorganic ash. All except the carbon, silica and inorganic ash exit the reaction in the gas phase. The residual solid is coke or char.

The gas and vapours pass down through the centre co-axial pipe (the path of least resistance) to exit and migrate back up through the coke residue where they take part in the Stage II reactions in which water vapour is converted to water gas.

Stage II—Water Gas Production

WATER GAS (or Blue gas) is produced when steam is blown through an incandescent bed of Carbon.

The gas production reactions are primarily:

$C+H_2O=CO+H_2$ $C+2H_2O=CO_2+2H_2$

These reactions occur when the water from the waste (steam) is passed back through the residual coke or char in the bottom 1-m of the reactor. Both of these reactions are endothermic. Therefore, the temperature of the bed of carbon through which the steam is blown would he lowered quickly to a point where no reaction would occur, if no heat were added to the system.

Operation

Initial Charge

1. The system was constructed and assembled as in FIGS. 4 and 5.
2. The gas extraction and feed lines to the system were hydraulically tested.
3. The reactor was filled with coconut shells (0.6 m³) and the reactor was sealed.
4. The system was purged with steam.
5. The cooling water system was started and valves in the gas extraction line to tank 1 were opened.
6. The LPG gas flow and air compressors were started and the gas was ignited.
7. When the reactor pressure had risen to 60-psi the exhaust compressor was started with feed to storage tank 1.
8. When the reactor pressure fell away gas to the burners was stopped.
9. The dipstick ball valve was opened and the system shut down.
10. The reactor was dipped. Steps 3 and 5–9 (but not step 4) were repeated if the bed depth was below 2 m from the top close valve.
11. If the bed depth was above 2-m, ash was removed to this level by opening the bottom hatch.

Methods—Testing Procedures

1. Three consecutive charges of 0.4-m³ of each of the following were sequentially added to the reactor.
   Municipal Garbage
   Rubber tyres
   Wet Bagasse
   Saw Dust
   Oil Sludge
2. The reactor was filled with the respective charge (0.4 m³) and the reactor was scaled.
3. The cooling water system was started and the valves in the gas extraction line to tank 1 were opened.
4. The gas flow was started from the previous gas storage tank and the air compressors and the gas was ignited. If no as was available the LPG gas valve was opened.
5. When the reactor pressure reached 60 psi (about 415 kPa), the exhaust compressor was opened with feed to the current storage tank.
6. When the reactor pressure fell away the gas to the burners was stopped, the dipstick ball valve was opened and the system shut down.
7. The reactor was dipped.
8. Steps 1–7 were repeated for the next charge.

Results

| | | Fired by |
|---|---|---|
| 1 | Charge 1-Garbage | LPG |
| | depth at end of previous charge | 220 cm |
| | depth at end of current charge | 230 cm |
| | residual from this charge | 0.1 m |
| | volume | 0.021214 m³ |
| 2 | Charge 2-Garbage | Produced gas |
| | depth at end of previous charge | 230 cm |
| | depth at end of current charge | 240 cm |
| | residual from this charge | 0.1 m |
| | Volume | 0.021214 m³ |
| 3 | Charge 3-Garbage | Produced gas |
| | depth at end of previous charge | 240 cm |
| | depth at end of current charge | 255 cm |
| | residual from this charge | 0.15 m |
| | volume | 0.031821 m³ |
| 4 | Charge 4-Tires | Produced gas |
| | depth at end of previous charge | 255 cm |
| | depth at end of current charge | 300 cm |
| | residual from this charge | 0.45 m |
| | volume | 0.095464 m³ |
| 5 | Charge 5-Tires | LPG |
| | depth at end of previous charge | 300 cm |
| | depth at end of current charge | 350 cm |

-continued

| | | Fired by |
|---|---|---|
| residual from this charge | 0.5 m | |
| volume | 0.106071 m³ | ash removed 200 Liters |
| | | 94.27609 cm |
| 6 Charge 6-Tires | | LPG |
| initial dip | 205 cm | |
| depth at end of current charge | 260 cm | |
| residual from this charge | 0.55 m | |
| volume | 0.116679 m³ | |
| 7 Charge 7-wet bagasse | | LPG |
| initial dip | 260 cm | |
| depth at end of current charge | 275 cm | |
| residual from this charge | 0.5 m | |
| volume | 0.031821 m³ | |
| 8 Charge 8-wet bagasse | | Produced gas |
| initial dip | 275 cm | |
| depth at end of current charge | 280 cm | |
| residual from this charge | 0.05 m | |
| volume | 0.010607 m³ | |
| 9 Charge 9-wet bagasse | | Produced gas |
| initial dip | 280 cm | |
| depth at end of current charge | 295 cm | |
| residual from this charge | 0.15 m | |
| volume | 0.031821 m³ | |
| 10 Charge 10-saw dust | | Produced gas |
| initial dip | 295 cm | |
| depth at end of current charge | 310 cm | |
| residual from this charge | 0.15 m | |
| Volume | 0.031821 m³ | |
| 11 Charge 11-saw dust | | Produced gas |
| initial dip | 310 cm | |
| depth at end of current charge | 320 cm | |
| residual from this charge | 0.1 | |
| volume | 0.021214 m³ | |
| 12 Charge 12-saw dust | | Produced gas |
| initial dip | 310 cm | |
| depth at end of current charge | 320 cm | |
| residual from this charge | 0.1 m | |
| volume | 0.021214 m³ | |
| 13 Charge 13-oil sludge | | Produced gas |
| initial dip | 320 cm | |
| depth at end of current charge | 325 cm | |
| residual from this charge | 0.05 m | |
| volume | 0.010607 m³ | |
| 14 Charge 14-oil sludge | | Produced gas |
| initial dip | 325 cm | |
| depth at end of current charge | 340 cm | |
| residual from this charge | 0.15 m | |
| volume | 0.031821 m³ | |
| 15 Charge 15-oil sludge | | Produced gas |
| initial dip | 340 cm | |
| depth at end of current charge | 355 cm | |
| residual from this charge | 0.15 m | |
| Volume | 0.031821 m³ | |
| residual at end of test 0.75 | 355 cm m³ | |
| total through put | 6.6 m³ | |
| % ash | 11.41 | |
| waste converted to gas | 5.8 m³ | |

The above results indicate that the destruction of rubber tyres does not sustain gas production. This is to be expected given the carbon content and lack of water. It could be expected that if it were mixed with a high water waste it would effect a very good yield of water gas.

Given the results of the tyre destruction it was decided to continue tyre destruction to assess the gas production. It was found that a further 5 charges of tyres was possible before the produced gas was exhausted and the system required the supplement of LPG.

The above results indicate that there is excess gas production from the destruction of most wastes, compared to the quantity of gas which is required for the destruction of the waste. In particular municipal garbage could be effectively disposed in this manner.

I claim:

1. A process for generating heat from a carbon-containing material which includes the steps of:
    (a) pyrolysing said material in a pyrolysis zone of a reactor at an elevated temperature to produce a carbon-enriched solid and a combustible gaseous product;
    (b) burning a first part of said combustible gaseous product to produce a first gaseous combustion product and to heat said pyrolysis zone so as to maintain said elevated temperature;
    (c) removing a second part of said combustible gaseous product from said reactor;
    (d) burning said second part of said combustible gaseous product to generate heat and produce second gaseous combustion products; and
    (e) returning said fist and second gaseous combustion products said pyrolysis zone.

2. A process according to claim 1 wherein said carbon-enriched solid is reacted with steam in said ore to produce a mixture containing hydrogen and carbon monoxide.

3. A process for generating heat from a carbon-containing material which includes the steps of:
    (a) pyrolysing said material in a pyrolysis zone at a first elevated temperature to produce a carbon-enriched solid and a first combustible gaseous product;
    (a') transferring said carbon-enriched solid and said first combustible gaseous product to a reaction zone;
    (b) reacting said carbon-enriched solid with water vapour in said reaction zone at a second elevated temperature to produce a second combustible gaseous product containing hydrogen gas and carbon monoxide;
    (c) burning a first pat of said second combustible gaseous product to produce first gaseous combustion products and to heat at east said reaction zone so as to maintain said second elevated temperature;
    (d) removing a second part of said combustible gaseous product from said reaction zone;
    (e) burning said second part of said combustible gaseous product to generate heat and second gaseous combustion product; and
    (f) returning said fast and second gaseous combustion products to said pyrolysis zone.

4. A process according to claim 3 wherein said pyrolysing step (a) and said reacting step (b) are carried out in the same reactor.

5. A process to claim 3 wherein said water vapour is produced in said pyrolysing stop (a).

6. A process for converting a carbon-containing material to a combustible gaseous fuel which includes the steps of:
    (a) pyrolysing said material in a pyrolysis zone at a first elevated temperature to produce a carbon-enriched solid and a first gaseous product;
    (b) reacting said carbon-enriched solid with water vapour in a second reaction zone at a second elevated temperature to produce a second gaseous product containing hydrogen gas and carbon monoxide;
    (c) burning a first part of (i) said first gaseous products (ii) said second gaseous product or (iii) a mixture thereof so as to heat at least said reaction zone and maintain said second elevated temperature; and (d) removing the remainder of said first and second gaseous products as said combustible gaseous fuel.

7. A process according to claim 6 wherein combustion products from burning said first part in step (c) are returned to said reaction zone.

8. A process according to claim 6 wherein step (c) consists of burning a first part of said second gaseous product.

9. A process according to claim 6 wherein said reaction zone is at a temp in the range of about 315° to about 450° C.

10. A process according to claim 6 wherein step (c) consists of burning a first part of a mixture of said first gaseous product and said second gaseous product.

11. A process according to claim 6 further comprising into said reaction zone combustion gases produced from burning said first part of a mixture of said first gaseous product and said gaseous product in step (c).

12. A process according to any one of claim 1, 3 or 6 wherein said carbon-containing material includes municipal waste, sewage or a mixture thereof.

13. A system for recovering energy from carbon-containing material, the system including:

a reactor vessel having an exterior and a interior, said reactor being equipped with means to admit said carbon-containing material to the vessel and heating means to heat the vessel;

gas offtake means operatively associated with the reactor vessel to permit combustible gases generated in the vessel to be removed therefrom;

a first gas conduit between said gas offtake means and said heating means to transfer a first part of said gases generated in said gas offtake means and said heating means, wherein the first gas conduit includes gas separation means which is capable of separating at least part of any hydrogen present in the gases generated in the vessel from other gases present, thereby producing a hydrogen-rich stream and a hydrogen depleted steam, and means to transfer the hydrogen-depleted to the heating means;

ignition means adapted to ignite said gases in said heating means; and energy recovery means operatively associated with the gas offtake means for recovery of energy from a second part of gases generated in said vessel.

14. A system according to claim 13, further comprising a second gas conduit between said heating means and said reactor vessel, to transfer gaseous combustion products from said heating means to the interior of said vessel.

* * * * *